(12) United States Patent
Prichard et al.

(10) Patent No.: US 10,438,308 B2
(45) Date of Patent: *Oct. 8, 2019

(54) SYSTEMS AND METHODS FOR IDENTIFYING ENTITIES USING GEOGRAPHICAL AND SOCIAL MAPPING

(71) Applicant: LexisNexis Risk Solutions FL Inc., Boca Raton, FL (US)

(72) Inventors: Johannes Philippus de Villiers Prichard, Boynton Beach, FL (US); Jesse C P B Shaw, Saint Cloud, MN (US); David Alan Bayliss, Delray Beach, FL (US)

(73) Assignee: LexisNexis Risk Solutions FL Inc., Boca Raton, FL (US)

( * ) Notice: Subject to any disclaimer, the term of this patent is extended or adjusted under 35 U.S.C. 154(b) by 574 days.

This patent is subject to a terminal disclaimer.

(21) Appl. No.: 15/202,099

(22) Filed: Jul. 5, 2016

(65) Prior Publication Data

US 2016/0328814 A1   Nov. 10, 2016

Related U.S. Application Data

(63) Continuation-in-part of application No. 13/848,850, filed on Mar. 22, 2013, now Pat. No. 9,412,141, (Continued)

(51) Int. Cl.
*H04L 29/06* (2006.01)
*G06Q 50/26* (2012.01)
(Continued)

(52) U.S. Cl.
CPC ....... *G06Q 50/265* (2013.01); *G06Q 30/0204* (2013.01); *H04L 67/18* (2013.01)

(58) Field of Classification Search
CPC ... G06Q 50/265; G06Q 30/0204; H04L 67/18
See application file for complete search history.

(56) References Cited

U.S. PATENT DOCUMENTS 3,922,678 A * 11/1975 Frenkel .................... G01S 5/02
                                                              342/457
5,404,561 A    4/1995 Castelaz
(Continued)

OTHER PUBLICATIONS

Liben-Nowell et al., Geographic Routing in Social Networks, PNAS, Aug. 16, 2005.*
(Continued)

*Primary Examiner* — David Garcia Cervetti
(74) *Attorney, Agent, or Firm* — Troutman Sanders LLP; James E. Schutz; Mark Lehi Jones

(57) ABSTRACT

Embodiments of the disclosed technology include systems and methods for identifying one or more entities associated with activities. In an example implementation, a method includes determining one or more geographical regions proximate to the plurality of locations associated with the one or more activities; determining connections between one or more identities of a population and a plurality of related entities associated with the one or more identities; determining geographical information associated with related entities; weighting one or more metrics for each of the identities based on the geographical information associated with the related entities and the or more geographical regions proximate to the plurality of locations associated with the one or more activities; scoring the one or more weighted metrics; and providing, based on the scoring, an indication of a likelihood that the one or more identities of the population are associated with the one or more activities.

20 Claims, 7 Drawing Sheets

Related U.S. Application Data which is a continuation-in-part of application No. PCT/US2013/026343, filed on Feb. 15, 2013, application No. 15/202,099, which is a continuation-in-part of application No. 13/541,092, filed on Jul. 3, 2012, now Pat. No. 8,549,590, and a continuation-in-part of application No. 13/541,157, filed on Jul. 3, 2012, now Pat. No. 8,682,755, and a continuation-in-part of application No. 10/357,489, filed on Feb. 4, 2003, now abandoned.

(60) Provisional application No. 61/603,068, filed on Feb. 24, 2012.

(51) Int. Cl.
    *H04L 29/08* (2006.01)
    *G06Q 30/02* (2012.01)

(56) References Cited

U.S. PATENT DOCUMENTS

| | | | | |
|---|---|---|---|---|
| 6,691,032 | B1 * | 2/2004 | Irish | A63F 13/12 701/487 |
| 6,957,177 | B1 * | 10/2005 | Brumitt | G06F 16/00 703/13 |
| 8,125,334 | B1 * | 2/2012 | Loyal | G08B 13/196 340/540 |
| 8,204,966 | B1 * | 6/2012 | Mendis | G06F 16/29 709/219 |
| 8,280,414 | B1 * | 10/2012 | Nourse | G01S 19/14 455/457 |
| 8,549,028 | B1 * | 10/2013 | Alon | G06Q 50/265 707/769 |
| 8,954,860 | B1 * | 2/2015 | Hands | G01C 21/3682 715/738 |
| 9,076,349 | B2 * | 7/2015 | Gupta | G06Q 30/02 |
| 9,137,500 | B1 * | 9/2015 | Wachman | H04N 7/181 |
| 9,232,040 | B2 * | 1/2016 | Barash | H04W 4/90 |
| 9,438,685 | B2 * | 9/2016 | Hernandez | H04L 67/22 |
| 9,648,075 | B1 * | 5/2017 | Kalinke | H04L 67/02 |
| 9,730,025 | B2 * | 8/2017 | Yuen | H04W 4/029 |
| 9,842,334 | B1 * | 12/2017 | Magi | G06Q 20/382 |
| 9,917,846 | B1 * | 3/2018 | Magi Shaashua | H04W 4/00 |
| 2002/0107858 | A1 | 8/2002 | Lundahl et al. | |
| 2003/0158815 | A1 * | 8/2003 | Yoshida | G06F 21/31 705/50 |
| 2003/0212519 | A1 | 11/2003 | Campos et al. | |
| 2003/0212567 | A1 * | 11/2003 | Shintani | G06Q 99/00 725/105 |
| 2005/0125295 | A1 * | 6/2005 | Tidwell | G06Q 20/042 705/16 |
| 2005/0125296 | A1 * | 6/2005 | Tidwell | G06Q 20/042 705/16 |
| 2005/0125337 | A1 * | 6/2005 | Tidwell | G06Q 20/042 705/39 |
| 2005/0125338 | A1 * | 6/2005 | Tidwell | G06Q 20/10 705/39 |
| 2005/0125339 | A1 * | 6/2005 | Tidwell | G06Q 20/042 705/39 |
| 2005/0125350 | A1 * | 6/2005 | Tidwell | G06Q 20/04 705/42 |
| 2006/0093222 | A1 | 5/2006 | Softer et al. | |
| 2006/0243798 | A1 * | 11/2006 | Kundu | G06Q 20/00 235/383 |
| 2007/0038950 | A1 * | 2/2007 | Taniguchi | G01C 21/26 715/768 |
| 2008/0140438 | A1 * | 6/2008 | Bares | G06Q 10/10 705/38 |
| 2008/0194268 | A1 * | 8/2008 | Koch | H04L 67/22 455/456.1 |
| 2008/0268873 | A1 * | 10/2008 | Wymeersch | G01S 5/0289 455/456.6 |
| 2008/0319806 | A1 * | 12/2008 | Abhyanker | G06Q 10/02 705/5 |
| 2009/0005987 | A1 * | 1/2009 | Vengroff | G06Q 30/02 701/300 |
| 2009/0073033 | A1 * | 3/2009 | Price | G06Q 30/02 342/357.34 |
| 2009/0089149 | A1 * | 4/2009 | Lerner | G01C 21/32 705/7.34 |
| 2009/0177589 | A1 | 7/2009 | Edgar et al. | |
| 2009/0198666 | A1 * | 8/2009 | Winston | G06Q 50/01 |
| 2009/0319188 | A1 * | 12/2009 | Otto | G06F 16/29 701/300 |
| 2009/0327135 | A1 * | 12/2009 | Nguyen | G06Q 20/40 705/44 |
| 2010/0076274 | A1 * | 3/2010 | Severson | A61B 5/16 600/300 |
| 2010/0076968 | A1 * | 3/2010 | Boyns | H04W 4/21 707/732 |
| 2010/0083169 | A1 * | 4/2010 | Athsani | H04M 1/72522 715/810 |
| 2010/0191462 | A1 * | 7/2010 | Kobuya | G01C 21/36 701/532 |
| 2010/0277588 | A1 * | 11/2010 | Ellsworth | G06F 16/9537 348/144 |
| 2011/0014897 | A1 * | 1/2011 | Finucan | G06Q 10/10 455/412.2 |
| 2011/0072085 | A1 * | 3/2011 | Standley | G06F 16/48 709/204 |
| 2011/0153553 | A1 * | 6/2011 | Klotz | G06Q 10/10 707/607 |
| 2011/0161136 | A1 * | 6/2011 | Faith | G06Q 30/0201 705/7.29 |
| 2011/0276396 | A1 * | 11/2011 | Rathod | G06Q 10/00 705/14.49 |
| 2011/0307382 | A1 * | 12/2011 | Siegel | G06Q 20/04 705/44 |
| 2012/0089326 | A1 * | 4/2012 | Bouve | G01C 21/3697 701/411 |
| 2012/0131121 | A1 * | 5/2012 | Snyder | G06Q 20/401 709/206 |
| 2012/0136565 | A1 * | 5/2012 | Kennedy | G01C 21/367 701/409 |
| 2012/0204112 | A1 * | 8/2012 | Levine | G06Q 10/109 715/733 |
| 2012/0209773 | A1 * | 8/2012 | Ranganathan | G06Q 20/40 705/44 |
| 2013/0024300 | A1 * | 1/2013 | Choudhuri | G06Q 30/018 705/16 |
| 2013/0024339 | A1 * | 1/2013 | Choudhuri | G06Q 30/0185 705/35 |
| 2013/0024358 | A1 * | 1/2013 | Choudhuri | G06Q 20/4016 705/38 |
| 2013/0024373 | A1 * | 1/2013 | Choudhuri | G06Q 30/018 705/42 |
| 2013/0024375 | A1 * | 1/2013 | Choudhuri | G06Q 40/00 705/44 |
| 2013/0024376 | A1 * | 1/2013 | Choudhuri | G06Q 40/00 705/44 |
| 2013/0052984 | A1 * | 2/2013 | Mohler | H04M 3/00 455/404.2 |
| 2013/0090980 | A1 * | 4/2013 | Hummel | G06Q 50/01 705/7.29 |
| 2013/0097246 | A1 * | 4/2013 | Zifroni | G06Q 50/01 709/204 |
| 2013/0132568 | A1 * | 5/2013 | Dankar | H04W 8/00 709/224 |
| 2013/0144784 | A1 * | 6/2013 | Yang | G06O 20/12 705/44 |
| 2013/0145288 | A1 * | 6/2013 | Zadeh | H04W 4/21 715/753 |
| 2013/0151143 | A1 * | 6/2013 | Lee | G01C 21/343 701/425 |
| 2013/0166385 | A1 * | 6/2013 | Russell | G06F 16/9535 705/14.58 |
| 2013/0166640 | A1 * | 6/2013 | Wilfert | G06F 16/9537 709/204 |

(56) References Cited

U.S. PATENT DOCUMENTS

| | | | |
|---|---|---|---|
| 2013/0196689 A1* | 8/2013 | Smith | H04W 4/21 455/456.3 |
| 2013/0198197 A1* | 8/2013 | Sawhney | G06F 17/2785 707/741 |
| 2013/0212655 A1* | 8/2013 | Hoyos | G06K 9/00107 726/5 |
| 2013/0218797 A1* | 8/2013 | Prichard | G06Q 50/265 705/325 |
| 2013/0218969 A1* | 8/2013 | Yerli | G06F 16/29 709/204 |
| 2013/0262311 A1* | 10/2013 | Buhrmann | G06Q 20/40 705/44 |
| 2013/0282438 A1* | 10/2013 | Hunter | G01S 1/02 705/7.32 |
| 2013/0317665 A1* | 11/2013 | Fernandes | G08G 5/0039 701/1 |
| 2014/0047024 A1* | 2/2014 | Karamchedu | G06Q 50/01 709/204 |
| 2014/0089043 A1* | 3/2014 | Weinstein | G06Q 30/02 705/7.29 |
| 2014/0099614 A1* | 4/2014 | Hu | G09B 19/00 434/236 |
| 2014/0129942 A1* | 5/2014 | Rathod | H04N 21/44222 715/720 |
| 2014/0156746 A1* | 6/2014 | Wheatley | H04L 67/22 709/204 |
| 2014/0162694 A1* | 6/2014 | Maier | H04W 4/04 455/456.3 |
| 2014/0171039 A1* | 6/2014 | Bjontegard | H04W 4/029 455/414.1 |
| 2014/0180826 A1* | 6/2014 | Boal | G06Q 30/0245 705/14.66 |
| 2014/0187205 A1* | 7/2014 | Dankar | H04W 4/021 455/411 |
| 2014/0189530 A1* | 7/2014 | Anand | H04L 65/403 715/753 |
| 2014/0189870 A1* | 7/2014 | Singla | G06F 21/6227 726/23 |
| 2014/0222704 A1* | 8/2014 | Abhyanker | H04W 4/21 705/319 |
| 2014/0236644 A1* | 8/2014 | Abhyanker | G06Q 10/087 705/5 |
| 2014/0258850 A1* | 9/2014 | Carey | G06Q 50/01 715/243 |
| 2014/0270404 A1* | 9/2014 | Hanna | G06Q 30/0609 382/116 |
| 2014/0270409 A1* | 9/2014 | Hanna | G06Q 30/0609 382/118 |
| 2014/0280532 A1* | 9/2014 | MacNiven | H04L 67/306 709/204 |
| 2014/0280576 A1* | 9/2014 | Cowan | H04L 67/306 709/204 |
| 2014/0297666 A1* | 10/2014 | Morris | G06F 16/2453 707/754 |
| 2014/0372385 A1* | 12/2014 | Martino | H04L 67/306 707/689 |
| 2014/0372904 A1* | 12/2014 | Liu | G01C 21/3415 715/753 |
| 2015/0005010 A1* | 1/2015 | Zhang | H04W 4/023 455/456.3 |
| 2015/0106268 A1* | 4/2015 | Carroll | G06Q 20/3224 705/44 |
| 2015/0127628 A1* | 5/2015 | Rathod | H04W 4/21 707/710 |
| 2015/0142595 A1* | 5/2015 | Acuna-Rohter | G06Q 20/40 705/21 |
| 2015/0193819 A1* | 7/2015 | Chang | G06Q 30/0252 705/7.19 |
| 2015/0245189 A1* | 8/2015 | Nalluri | G06Q 50/265 455/404.1 |
| 2015/0295808 A1* | 10/2015 | O'Malley | H04L 47/22 709/224 |
| 2015/0317801 A1* | 11/2015 | Bentley | H04N 7/181 382/107 |
| 2015/0318015 A1* | 11/2015 | Bose | H04N 7/188 386/248 |
| 2016/0005003 A1* | 1/2016 | Norris | G06Q 10/10 705/7.19 |
| 2016/0034827 A1* | 2/2016 | Morris | G06Q 10/109 705/5 |
| 2016/0110433 A1* | 4/2016 | Sawhney | G06F 16/9535 707/722 |
| 2016/0127485 A1* | 5/2016 | Tseng | H04W 4/21 709/205 |
| 2016/0357768 A1* | 12/2016 | Strong | H04W 4/021 |
| 2017/0222962 A1* | 8/2017 | Gauglitz | H04W 4/21 |
| 2018/0299291 A1* | 10/2018 | Thomas | G01C 21/3694 |

OTHER PUBLICATIONS

International Search Report and Written Opinion for PCT/US2014/024709 dated Aug. 5, 2014.

International Search Report and Written Opinion for PCT/US2013/026343 dated May 20, 2013.

* cited by examiner

SYSTEMS AND METHODS FOR IDENTIFYING ENTITIES USING GEOGRAPHICAL AND SOCIAL MAPPING

CROSS-REFERENCE TO RELATED APPLICATIONS

This application is a Continuation of U.S. patent application Ser. No. 13/848,850, filed on 22 Mar. 2013, and published as U.S. Patent Publication No. US2013/0218797 on 22 Aug. 2013, entitled "Systems and Methods for Identifying Entities Using Geographical and Social Mapping," the contents of which are hereby incorporated by reference in their entirety.

U.S. patent application Ser. No. 13/848,850 is a Continuation-in-Part of P.C.T. Application Ser. No. PCT/US2013/026343, filed on 15 Feb. 2013, entitled "Systems and Methods for Putative Cluster Analysis," which claims priority to U.S. Provisional Application Ser. No. 61/603,068, filed on 24 Feb. 2012, entitled: "Systems and Methods for Putative Cluster Analysis," the contents of which are hereby incorporated by reference in their entirety.

This application is also a Continuation-in-Part of U.S. patent application Ser. No. 13/541,092 filed on 3 Jul. 2012, now U.S. Pat. No. 8,549,590, issued 1 Oct. 2013, and entitled: "Systems and Methods for Identity Authentication Using a Social Network."

This application is also a Continuation-in-Part of U.S. patent application Ser. No. 13/541,157 filed on 3 Jul. 2012, now U.S. Pat. No. 8,682,755, issued 25 Mar. 2014, and entitled: "Systems and Methods for Detecting Tax Refund Fraud," the contents of which are hereby incorporated by reference in their entirety.

This application is also a Continuation-in-Part of U.S. patent application Ser. No. 10/357,489 to Bayliss, David et al. (hereinafter Bayliss II), filed 4 Feb. 2003, entitled "Method and System for Associating Entities and Data Records," now abandoned, the contents of which are hereby incorporated by reference in their entirety.

This application is also related to U.S. Pat. No. 7,403,942 to Bayliss, David et al. (hereinafter Bayliss I), filed 4 Feb. 2003, entitled Method and System for Processing Data Records," the contents of which are hereby incorporated by reference in their entirety.

TECHNICAL FIELD

Various embodiments described herein relate to systems and methods for identifying individuals or networks associated with certain activities based on geographical and social network mapping.

BACKGROUND

Certain illegal activities continue to present difficult challenges for many businesses, public operations, e-commerce, law enforcement, and other systems, particularly when such activities are tied to multiple geographic locations and/or multiple perpetrators. The results can be very costly to both the business and the, and methods for identifying individuals responsible for such activities are needed.

BRIEF SUMMARY

Some or all of the above needs may be addressed by certain embodiments of the disclosed technology. According to an example embodiment of the disclosed technology, a method is provided for identifying one or more entities associated with one or more activities. The method may include determining, from a plurality of locations associated with one or more activities, one or more geographical regions proximate to the plurality of locations. The method may also include determining, from a system graph, connections between one or more identities of a population and a plurality of related entities associated with the one or more identities; determining geographical information associated with the plurality of related entities; weighting one or more metrics for each of the one or more identities of the population based at least in part on the geographical information associated with the plurality of related entities and the or more geographical regions proximate to the plurality of locations associated with the one or more activities; scoring the one or more weighted metrics; and providing, based on the scoring, an indication of a likelihood that the one or more identities of the population are associated with the one or more activities.

In an example implementation, a system is provided. The system may include one or more processors; at least one memory in communication with the one or more processors. The at least one memory may include at least one memory for storing data and computer-executable instructions to determine, from a plurality of locations associated with one or more activities, one or more geographical regions proximate to the plurality of locations; determine, from a system graph, connections between one or more identities of a population and a plurality of related entities associated with the one or more identities; determine geographical information associated with the plurality of related entities; weight, with the at least one processor, one or more metrics for each of the one or more identities of the population based at least in part on the geographical information associated with the plurality of related entities and the or more geographical regions proximate to the plurality of locations associated with the one or more activities; score, with the at least one processor, the one or more weighted metrics; and output, based on the scoring, an indication of a likelihood that the one or more identities of the population are associated with the one or more activities.

According to an example embodiment of the disclosed technology, a computer-readable media is provided for performing a method for identifying one or more entities associated with one or more activities. The method may include determining, from a plurality of locations associated with the one or more activities, one or more geographical regions proximate to the plurality of locations. The method may also include determining, from a system graph, connections between one or more identities of a population and a plurality of related entities associated with the one or more identities; determining geographical information associated with the plurality of related entities; weighting one or more metrics for each of the one or more identities of the population based at least in part on the geographical information associated with the plurality of related entities and the or more geographical regions proximate to the plurality of locations associated with the one or more activities; scoring the one or more weighted metrics; and providing, based on the scoring, an indication of a likelihood that the one or more identities of the population are associated with the one or more activities.

These and other embodiments of the disclosed technology will be described in more detail below with reference to the figures.

DETAILED DESCRIPTION

Figure 1:
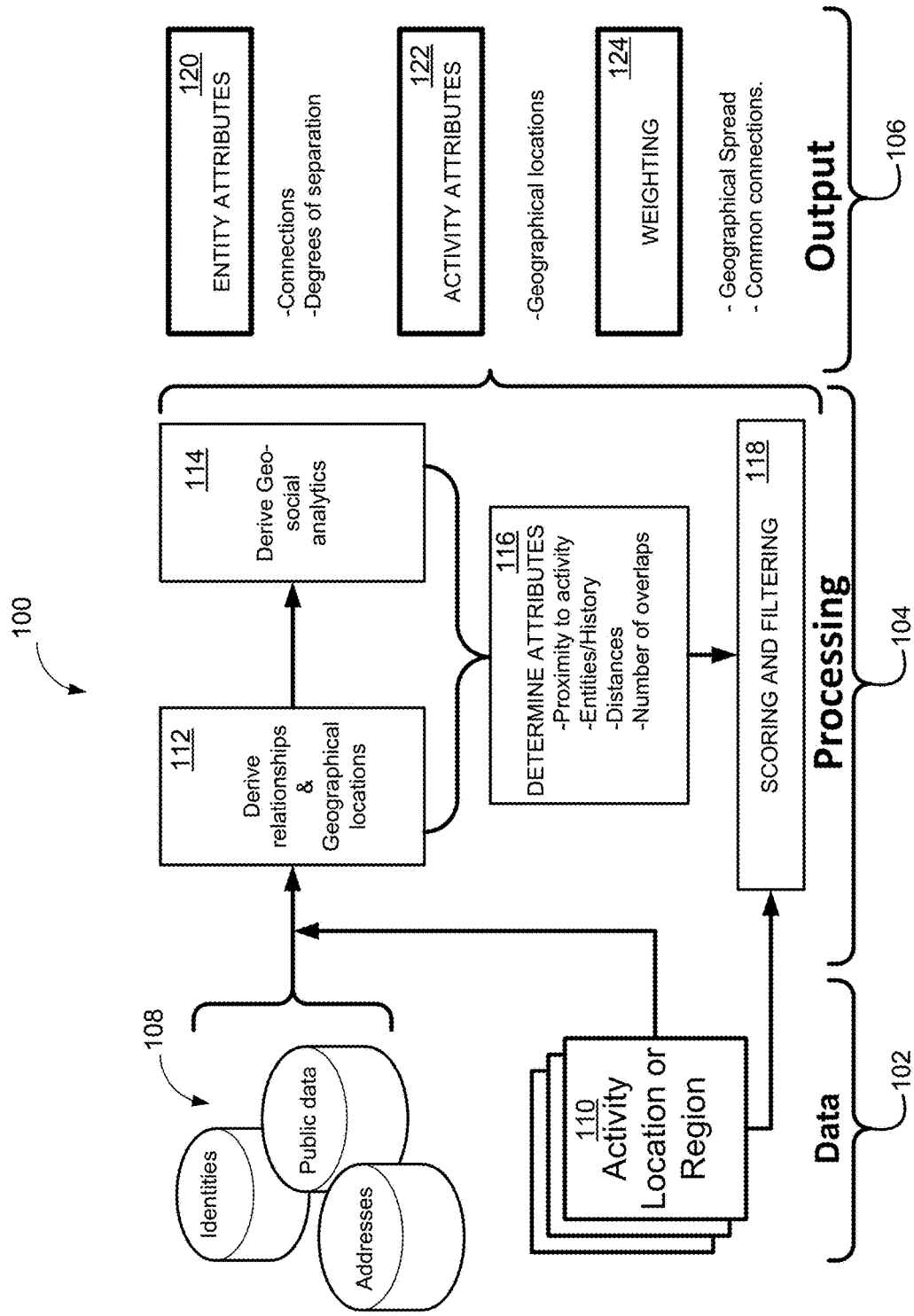
FIG. 1 illustrates an example geo-social analysis system according to an example implementation of the disclosed technology.

To facilitate an understanding of the principles and features of the disclosed technology, various illustrative embodiments are explained below. Embodiments of the disclosed technology, however, are not limited to these embodiments. The systems and methods described hereinafter as making up elements of the disclosed technology are intended to be illustrative and not restrictive. Many suitable end-use applications that could utilize same or similar functions as described herein are intended to be embraced within the scope of the disclosed technology.

As used herein, the use of the terms "location information" or "geographical information" is intended to include data representative of a physical location, including but not limited to a state, city, zip code, street, address, building, global positioning coordinates, latitude/longitude, regular or irregular-shaped regions surrounding a point, etc. The location or geographical information, as used herein may also encompass local features of the physical location, including but not limited to man-made features (such as streets, buildings, walking spaces, etc.,) and natural features (such as rivers, mountains, natural borders, etc.). As used herein, the term "location" may include any of a city, a zip code, a neighborhood, a street, a block, a USPS address, a latitude/longitude, a proxy for an address, IP address, etc.

As used herein, the term "social network" is intended to include system graph information that may be used to link entities. Such information may be obtained from publicly available data, such as public records including, but not limited to housing records, vehicular records, marriage records, divorce records, hospital records, birth records, death records, court records, property records, employment records, business records, address records, tax records, corporate records, etc. Embodiments of the disclosed technology may also utilize derived, private, and/or proprietary data for determining the system graph information.

As used herein, the term "geo-social" may refer to systems and methods that utilize both geographical information and social network information.

Briefly described, various embodiments of the disclosed technology may be utilized to identify individuals and/or networks associated with certain activities based on geographical and social network mapping. In one example implementation, a social network for an individual may be analyzed to determine geographical locations of associates, relatives, business partners, etc., relative to certain activities. According to one example implementation, the activities may be related to incidents of identity theft. In another example implementation, the activities may be related to online purchases, for example, where goods may be shipped to a vacant (or foreclosed) address and locally monitored or controlled by a person (for retrieval of the goods) without being linked to the address.

In an example embodiment, social network and geographical information may be utilized to identify one or more probable perpetrators of crimes or individuals associated with certain activities. For example, in one embodiment, a person's social network may be analyzed for geographical proximities to locations associated with certain activities. For example, a person's social network may be analyzed for geographical proximities to addresses of identity theft victims. In certain example embodiments, thresholds, weightings, etc., may be applied based on attributes of the information, and scoring may be performed to produce confidence levels that a particular person or network may be involved in such activities.

In accordance with one example embodiment, a social graph may be determined for every person in a given population. For example, embodiments of the disclosed technology may be utilized to determine social graphs for each person in the United States to determine individuals that are related in some way, including, but not limited to family, business associates, friends, past roommates, etc. In an example embodiment, locations, addresses, or regions of an activity (for example, addresses of identity theft victims) may be compared with current home and/or work addresses for the people in an individual's social network. In certain example embodiments, a distance may be calculated between such locations. According to an example embodiment, such data may be utilized to identify certain patterns, confidence values, scores, etc. In an example implementation, all members of the social network may be considered. In other example implementations, only individuals having certain connection criteria may be considered to reduce the computation complexity.

Certain embodiments of the disclosed technology may provide improved accuracy over conventional systems and techniques. For example, law enforcement departments attempting to identify perpetrators of certain fraudulent activities (such as identity theft) may utilize conventional focused analysis techniques that examine each event in isolation. The conventional techniques typically utilize high thresholds to filter the large number of events to be analyzed. In other words, because the data that must be analyzed with conventional techniques is so large, a high degree of suspicious activity may be required in order to identify individuals or entities associated with the activity. Without a high threshold, conventional techniques may have too many potentially fraudulent events to investigate. As a result, entities using conventional techniques often overlook collusion from groups that are able to stay below these high thresholds with respect to certain suspicious activities.

The geo-social analysis system disclosed herein may be capable of efficiently leveraging readily available data to help detect individuals involved with certain activities. For example, according to one embodiment, perpetrators of identity theft may be identified based on social and geographical relationships.

According to an example implementation of the disclosed technology, geo-social mapping system may start with large quantity of data and group that data into smaller, distinct units or networks. In an example embodiment, seemingly low risk activity within each network may be measured to identify potentially organized groups without having to apply low thresholds to the large amounts of data as a whole.

In accordance with certain example embodiments of the disclosed technology, high interest geo-social networks may be identified from a plurality of data. High interest geo-social networks, for example, may represent connected organizations, entities, and or people. In certain example implementations, the geo-social analysis system disclosed herein may rely upon relatively large amounts of data to measure seemingly low risk events to detect potentially fraudulent activities.

In one example embodiment, a domain of entities may be identified for analysis. For example, data associated with a large number (perhaps hundreds of millions) of individuals may be gathered for analysis. The data may include identities of individuals, organizations, companies, etc. The data may include information such as a physical address and/or relationship information. According to certain example embodiments of the disclosed technology, one or more types of relationships between the entities may then be collected.

In certain embodiments, a filtering mechanism may operate against the networks and may retain those networks that have outlying behavior. Such filtering may conventionally utilize graph-or network analysis, and queries/filtering of this form may utilize sub-graph matching routines or fuzzy sub-graphs matching. However, sub-graph matching routines or fuzzy-sub-graphs matching techniques may be NP-complete, and thus, impractical for analyzing large sets of data. The most notable characteristic of NP-complete problems is that no fast solution to them is known. That is, the time required to solve the problem using any currently known algorithm increases very quickly as the size of the problem grows. This means that the time required to solve even moderately sized versions of many of these problems can easily reach into the billions or trillions of years, using any amount of computing power available today. Embodiments of the disclosed technology may be utilized to determine or provide connections between entities even though the set of data analyzed may be extremely large.

In accordance with an example implementation of the disclosed technology, entities may be identified and may include people, companies, places, objects, virtual identities, etc. In an example embodiment, relationships may be formed in many ways, and with many qualities. For example, co-occurrence of values in common fields in a database may be utilized, such as the same last name. Relationships may also be formed using multiple co-occurrence of an entity with one or more other properties, such as people who have lived at two or more addresses.

Relationships may also be formed based on a high reoccurrence and/or frequency of a common relationship, according to an example embodiment. For example, records of person X sending an email to person Y greater than N times may indicate a relationship between person X and person Y. In another example embodiment, if person X sends an email to or receives an email from person Y, and within a short period of time, person Z sends an email or receives an email from person Y, then a relationship may be implied between person X and person Z.

In accordance with an example implementation of the disclosed technology, relationships between entities may comprise Boolean, weighted, directed, undirected, and/or combinations of multiple relationships. According to certain example embodiments of the disclosed technology, clustering of the entities may rely on relationships steps. In one embodiment, entities may be related by at least two different relationship types. In one embodiment, relationships for the network connection analysis may be established by examining weights or strengths of connections between entities in certain directions and conditional upon other relationships, including temporal relationships. For example, in one embodiment, the directional relationships between entities X, Y, and Z may be examined and the connection between X, Y, and Z may be followed if there is a link between Y and Z happened (in time) after the link was established between X and Y.

Many methods may be utilized to filter networks once they are identified. For example, in one embodiment, networks may be scored. In another embodiment, a threshold may be utilized to identify networks of interest. According to an example embodiment of the disclosed technology, a model may be utilized to compute a number of statistics on each network. In one embodiment, the model may be as simple as determining counts. In another embodiment, the model may detect relationships within a network, for example, entities that are related to the centroid of the network that are also related to each other. This analysis may provide a measure of cohesiveness of relationships that exist inside the network. According to an example embodiment of the disclosed technology, once the statistics have been computed, scoring and weighting of each network may be utilized to determine which networks rise above a particular threshold, and may be classified as "interesting." In accordance with an example embodiment of the disclosed technology, and weighting and/or scoring of the determined statistics may be accomplished using a heuristic scoring model, such as linear regression, neural network analysis, etc.

An example analytics method may be implemented by geo-social analysis system 100, as illustrated in FIG. 1. It will be understood that the method illustrated herein is provided for illustrative purposes only and does not limit the scope of the disclosed technology.

The geo-social analysis system 100 may receive a plurality of data 102 to be analyzed. In accordance with an example embodiment, the data may be processed 104, and output 106 may be generated. In one example embodiment, the data 102 may include identities, public data, and addresses associated with the identities 108. The data may also include information 110, for example, that may include data related to one or more activities and/or locations associated with the activities. In an example embodiment, the system 100 may receive the data 102 in its various forms and may process 104 the data 102 to derive relationships and locations 112 and perform geo-social analytics 114. In an example embodiment, the relationships 112 and analytics 114 may be used to determine particular attributes 116. For example, the attributes 116 may include one or more of the following: proximity to the one or more activities, entity information including history, distances, number of overlaps, etc.

According to an example embodiment of the disclosed technology, the determined attributes 116 may be processed by a scoring and filtering process 118, which may result in an output 106 that may include one or more entity attributes 120, activity attributes 122, and weightings 124. In accordance with an example embodiment of the disclosed technology, the entity attributes 120 may include connections and degrees of separation between entities. For example, the connections may include a list of names of known or derived business associates, friends, relatives, etc. The degrees of separation may be an indication of the strength of the connection. For example, two people having a shared residence may result in a connection with a degree of 1. In another example implementation, two people working for the same company may have a degree of 2. In one example implementation, the degree of separation may be inversely proportional to the strength of the connection. In other example embodiments, different factors may be contribute to the degree value, and other values besides integers may be utilized to represent the connection strength.

According to an example embodiment, the activity attributes 122 may include geographical location information. For example, the geographical information may include one or more of an address, GPS coordinates, latitude/longitude, physical characteristics about the area, whether the address is a single family dwelling, apartment, etc.

In an example implementation, the output 105 may include weightings 124 that may represent information such as geographical spread of an individual's social network. In an example implementation, the weighting 124 may also include a measure of connections that are in common. Such information may be utilized to vary the output.

According to an example implementation of the disclosed technology, geo-social analysis system 100 may treat each data point in the data as a centroid of its own cluster. Thus, the total number of geo-social networks may be equal to the total number of data points, and each cluster may be uniquely represented by its centroid data point. The distance between the centroid and any data point within each cluster may be limited, such that the geo-social networks are limited in size and, for some analyses, may be treated as being disconnected from one another. An example method of clustering data for the purposes of the example implementation of the disclosed technology of the geo-social analysis systems and methods is disclosed in Bayliss I and II, which are incorporated herein.

According to an example implementation of the disclosed technology, scoring and filter 118 may be applied, for example, to analyze the geo-social networks and assign one or more scores to each network. In an example implementation, a scoring unit may utilize a predetermined scoring algorithm for scoring some or all of the networks. In another example implementation, the scoring unit may utilize a dynamic scoring algorithm for scoring some or all of the networks. The scoring algorithm, for example, may be based on seemingly low-risk events that tend to be associated with organizations, such as fraud organizations. The algorithm may thus also be based on research into what events tend to be indicative of fraud in the industry or application to which the geo-social analysis system is directed.

In one example implementation, each geo-social network may be scored individually. For example, a plurality of predetermined attributes, or variables, may be calculated for each network based on the data points in the network. For each attribute, the geo-social network as a whole may be considered, or each data point or link between pairs of entities may be considered.

In accordance with an example implementation of the disclosed technology, the geo-social analysis system 100 may leverage publicly available data as input data 108, which may include several hundred million records. The geo-social analysis system 100 may also clean and standardize data to reduce the possibility that matching entities are considered as distinct. Before creating the geo-social graph, the geo-social analysis system 100 may use this data to build a large-scale network map of the population in question and its associated social networks.

According to an example implementation, the geo-social analysis system 100 may leverage a relatively large-scale of supercomputing power and analytics to target organized collusion. Example implementation of the disclosed technology of the geo-social analysis systems and methods may rely upon open-source large scale parallel-processing computing platforms to increase the agility and scale of solutions.

Example implementations of the disclosed technology of the geo-social analysis systems and methods may measure behavior, activities, and/or relationships to actively and effectively expose syndicates and rings of collusion. Unlike many conventional systems, the geo-social analysis system need not be limited to activities or rings operating in a single geographic location, and it need not be limited to short time periods. The geo-social analysis systems and methods disclosed herein thus may enable investigations to prioritize efforts on organized groups more effectively, rather than investigating individual transactions to determine whether they fall within an organized ring or certain geographical location.

In one example implementation, a filter may be utilized to reduce the data set to identify groups that evidence the greatest connectedness based on the scoring algorithm. In one example implementation, geo-social networks with scores that match or exceed a predetermined set of criteria may be flagged for evaluation. In an example implementation of the disclosed technology, filtering may utilize one or more target scores, which may be selected based on the geo-social analysis system, or the scoring algorithm. In one example implementation, geo-social networks having scores greater than or equal to a target score may be flagged as being potentially collusive.

Figure 2:
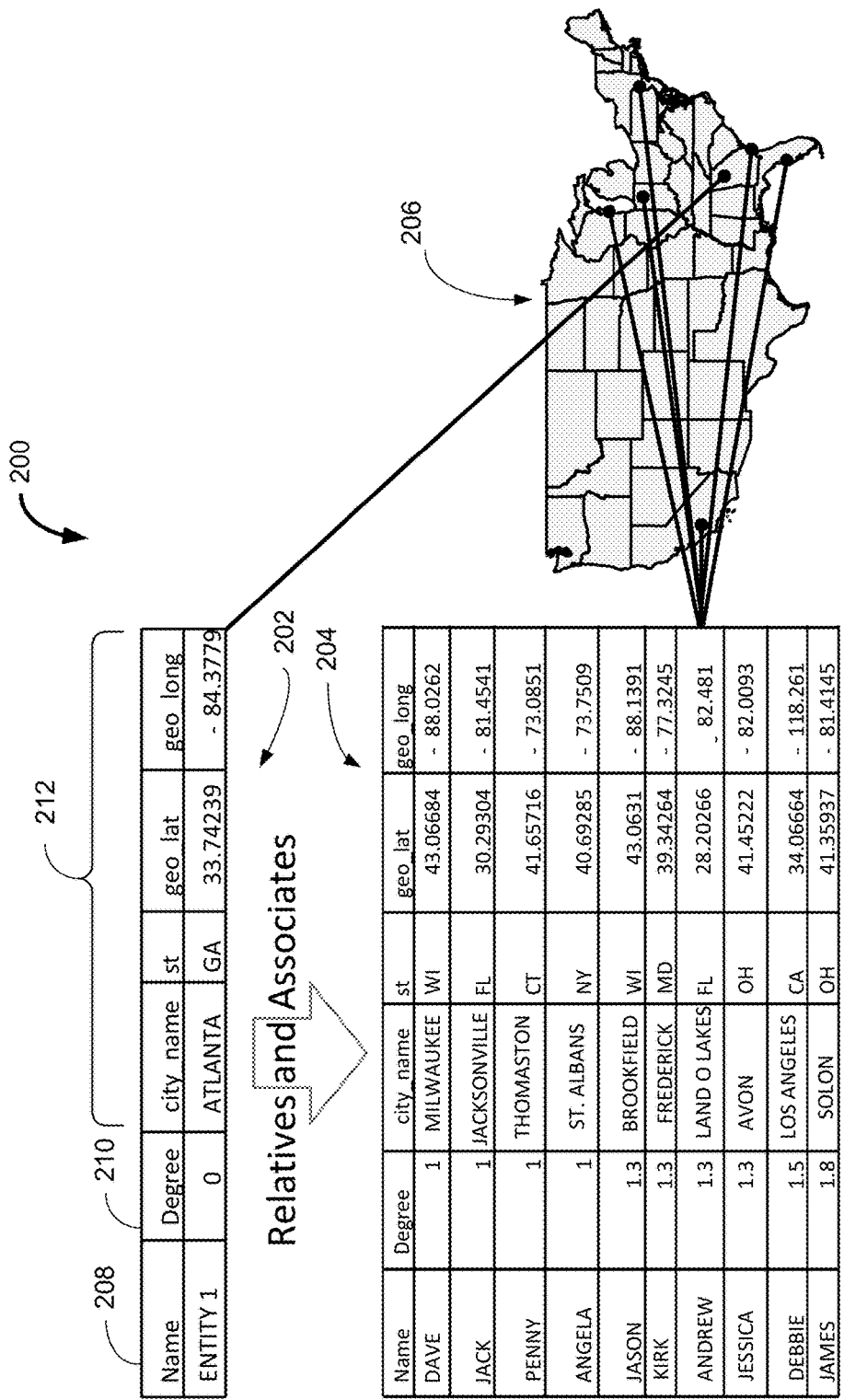
FIG. 2 illustrates an example geo-social network 204 for a particular individual 202.

FIG. 2 is an illustration 200 of an example geo-social network 204 for a particular individual 202, with an example graphical representation of the geo-social map 206 derived from the geo-social network 204 information. This particular example is over-simplified for clarity, and it should be realized that such geo-social networks, in practice, may actually contain hundreds of thousands of connections linking a particular to relatives and associates. In one example implementation, the geo-social data may include the entity name 208, the degree of separation 210, and geographical information 212 associated with the entity.

Figure 3:
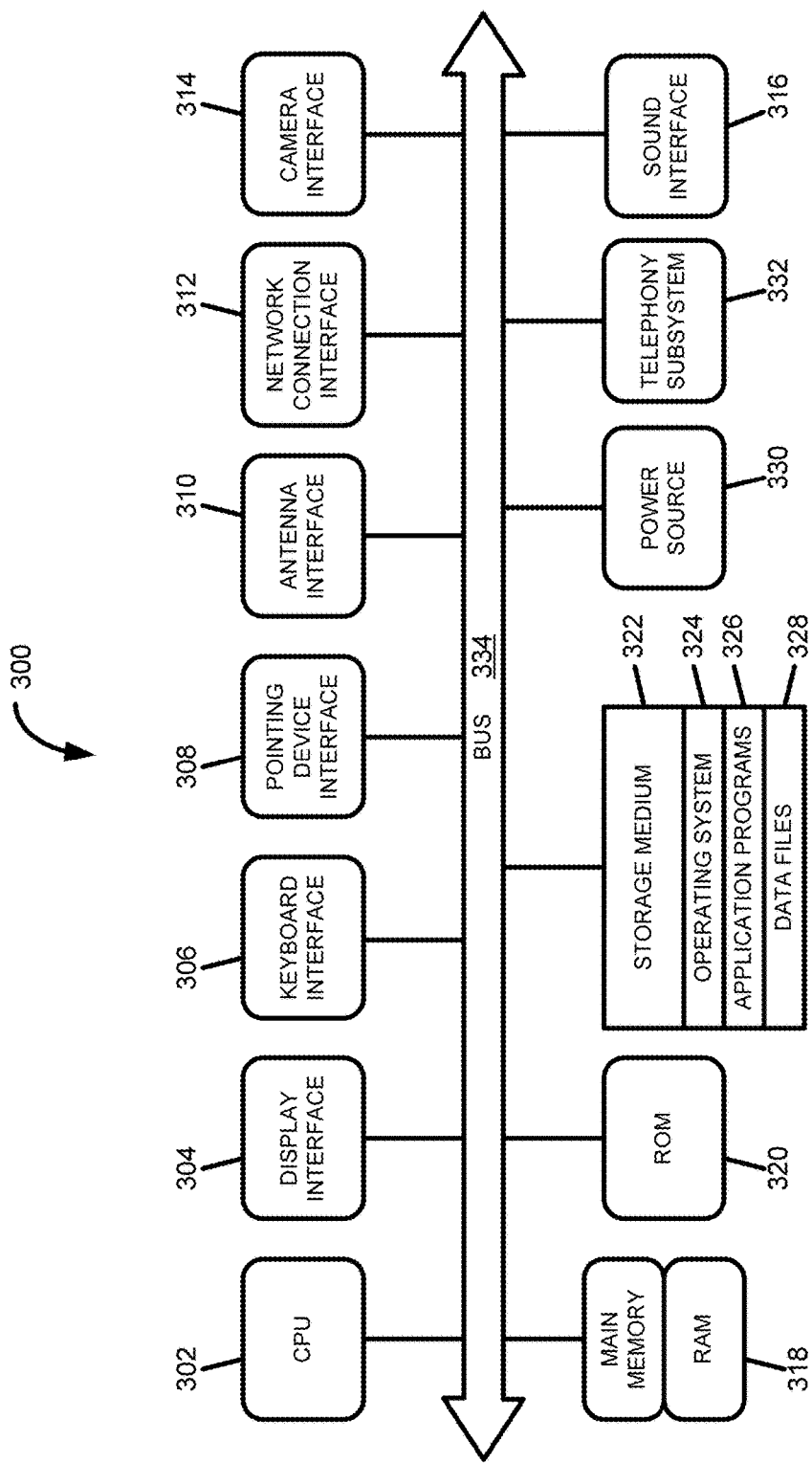
FIG. 3 illustrates a representative computer architecture, according to an example embodiment of the disclosed technology.

FIG. 3 depicts a block diagram of an illustrative computer system architecture 300 according to an example implementation of the disclosed technology. Various implementations and methods herein may be embodied in non-transitory computer readable media for execution by a processor. It will be understood that the architecture 300 is provided for example purposes only and does not limit the scope of the various implementations of the communication systems and methods.

The architecture 300 of FIG. 3 includes a central processing unit (CPU) 302, where computer instructions are processed; a display interface 304 that acts as a communication interface and provides functions for rendering video, graphics, images, and texts on the display. In certain example implementations of the disclosed technology, the display interface 304 may be directly connected to a local display. In another example implementation, the display interface 304 may be configured for providing data, images, and other information for an external/remote display or computer that is not necessarily connected to the particular CPU 302. In certain example implementations, the display interface 304 may wirelessly communicate, for example, via a Wi-Fi channel or other available network connection interface 312 to an external/remote display.

The architecture 300 may include a keyboard interface 306 that provides a communication interface to a keyboard; and a pointing device interface 308 that provides a communication interface to a pointing device, mouse, and/or touch screen. Example implementations of the architecture 300 may include an antenna interface 310 that provides a communication interface to an antenna; a network connection interface 312 that provides a communication interface to a network. As mentioned above, the display interface 304 may be in communication with the network connection interface 312, for example, to provide information for display on a remote display that is not directly connected or attached to the system. In certain implementations, a camera interface 314 may be provided that may act as a communication interface and/or provide functions for capturing digital images from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the architecture 300 includes a read-only memory (ROM) 320 where invariant low-level system code or data for basic system functions such as basic input and output (I/O), startup, or reception of keystrokes from a keyboard are stored in a non-volatile memory device. According to an example implementation, the architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 and data files 328 are stored. The application programs 326 may include geo-socialing instructions for organizing, storing, retrieving, comparing, and/or analyzing the various connections associated with the properties and entities associated with embodiments of the disclosed technology. According to example implementations of the disclosed technology, the geo-social analysis system, the clustering unit, and/or the scoring unit may be embodied, at least in part, via the application programs 326 interacting with data from the ROM 320 or other memory storage medium 322, and may be enabled by interaction with the operating system 324 via the CPU 302 and bus 334.

According to an example implementation, the architecture 300 includes a power source 330 that provides an appropriate alternating current (AC) or direct current (DC) to power components. According to an example implementation, the architecture 300 may include and a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data may be stored in the RAM 318, where the data may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

Figure 4:
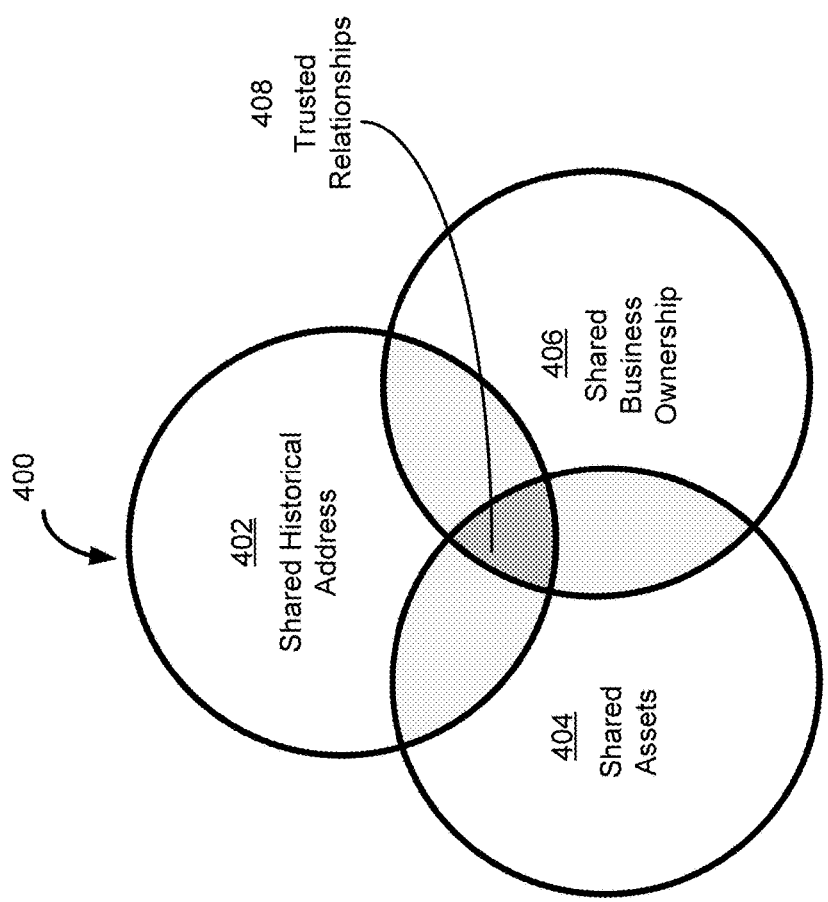
FIG. 4 illustrates an example overlap of social network information, according to an example embodiment of the disclosed technology.

FIG. 4 illustrates a Venn diagram 400 for determining relationships and strengths of the relationships between individuals. For example, the overlap of certain attributes, such as a shared historical address 402 and shared assets 404 may provide a certain indication that two people are closely related, or have a strong connection. If, in addition to these two overlapping attributes, there is also a shared business ownership 406, then it could be reasonable to assume that the individuals share a trusted relationship 408 and the connection strength is very high. Such overlap information may be used by the geo-social network analysis system for weightings, filtering, scorings, etc.

Figure 5:
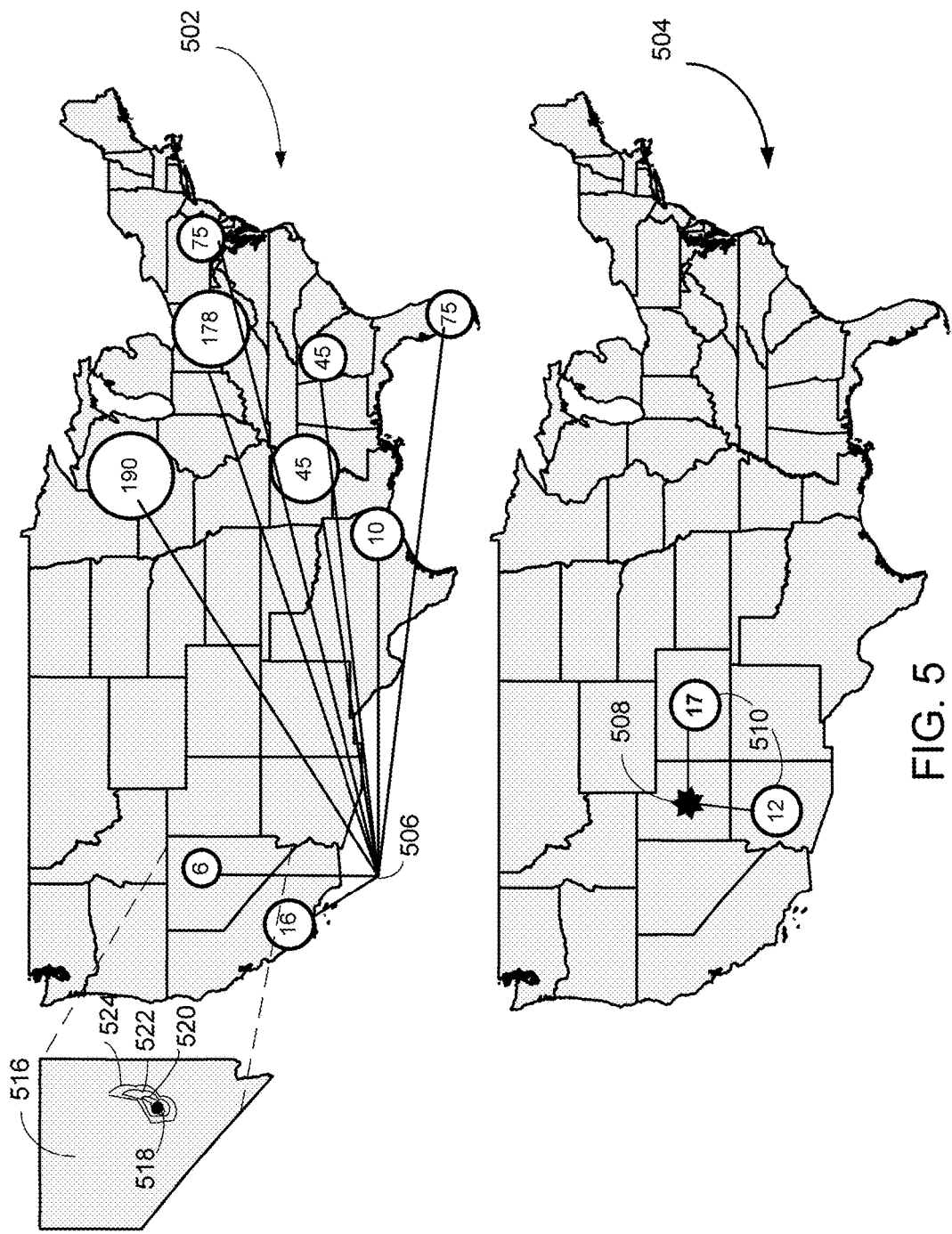
FIG. 5 illustrates activity locations 502 and an individual geo-social network 504, according to an example embodiment of the disclosed technology.

FIG. 5 illustrates an example application of the disclosed technology, as it may be applied to activities associated with identity theft. Many other example applications may utilize the systems and methods of the disclosed technology, and this particular illustrative example is not intended to limit the scope of the disclosed technology. FIG. 5 depicts regions of high identity theft locations 502 (top map) and an individual's 508 geo-social network 504 (bottom map) for comparison. In this example, it may be apparent that the regions 506 of the identity theft locations 502 (top map) and the locations 510 of connected entities in an individual's 508 geo-social network 504 (bottom map) are not well matched geographically. Thus, in this simplified example, the individual 508 associated with the geo-social network 504 may score low (by the geo-social analysis system) as a suspect involved in identity theft. In this illustration, the regions 506 of identity theft, in an example embodiment, may be represented by the number of identity thefts that have occurred, and the geographical regions, locations, and/or addresses corresponding the victims of the identity theft. For example, the identity theft locations 502 (top map) may indicate 16 incidences of identity theft in a certain San Francisco neighborhood in Calif. But the locations 510 of connected entities in an individual's 508 geo-social network 504 (bottom map) may indicate that this particular individual 508 only has connections to people locally (in Utah), in certain regions of Colorado (17 connections), and Arizona (12 connections).

FIG. 5 also depicts an enlarged version of the state of Nevada 516 to illustrate a feature of the disclosed technology. For example, a region 518 associated with a high incidence of identity theft may be represented in the analysis as a heat map, topographical map, etc., that may have one or more areas 520, 522, 524 surrounding the region 518 of high incidence. In this example embodiment, each of the areas may be scored based on the distance from the incidents of identity theft. In certain example embodiments, the one or more areas 520, 522, 524 surrounding the region 518 of high incident may be shaped corresponding to geographical features, such as roads, rivers, man-made structures, natural structures, etc. In an example implementation, a person in an individual's network who lives near a region 518 of high incidence of identity theft may be scored based upon the distance they live or work from the actual address of the identity theft victim, or on the grading of the one or more areas 520, 522, 524 surrounding the region 518 of identity theft. In an example implementation, the various geographical features that may make it more likely for travelling certain routes may factor into a score. For example, in one direction, a perpetrator may be blocked from a certain region of town by a river or other physical feature, but may easily access other parts of town. The scoring, filtering, and weighting algorithms may take such factors into account when scoring a particular geo-social network.

Figure 6:
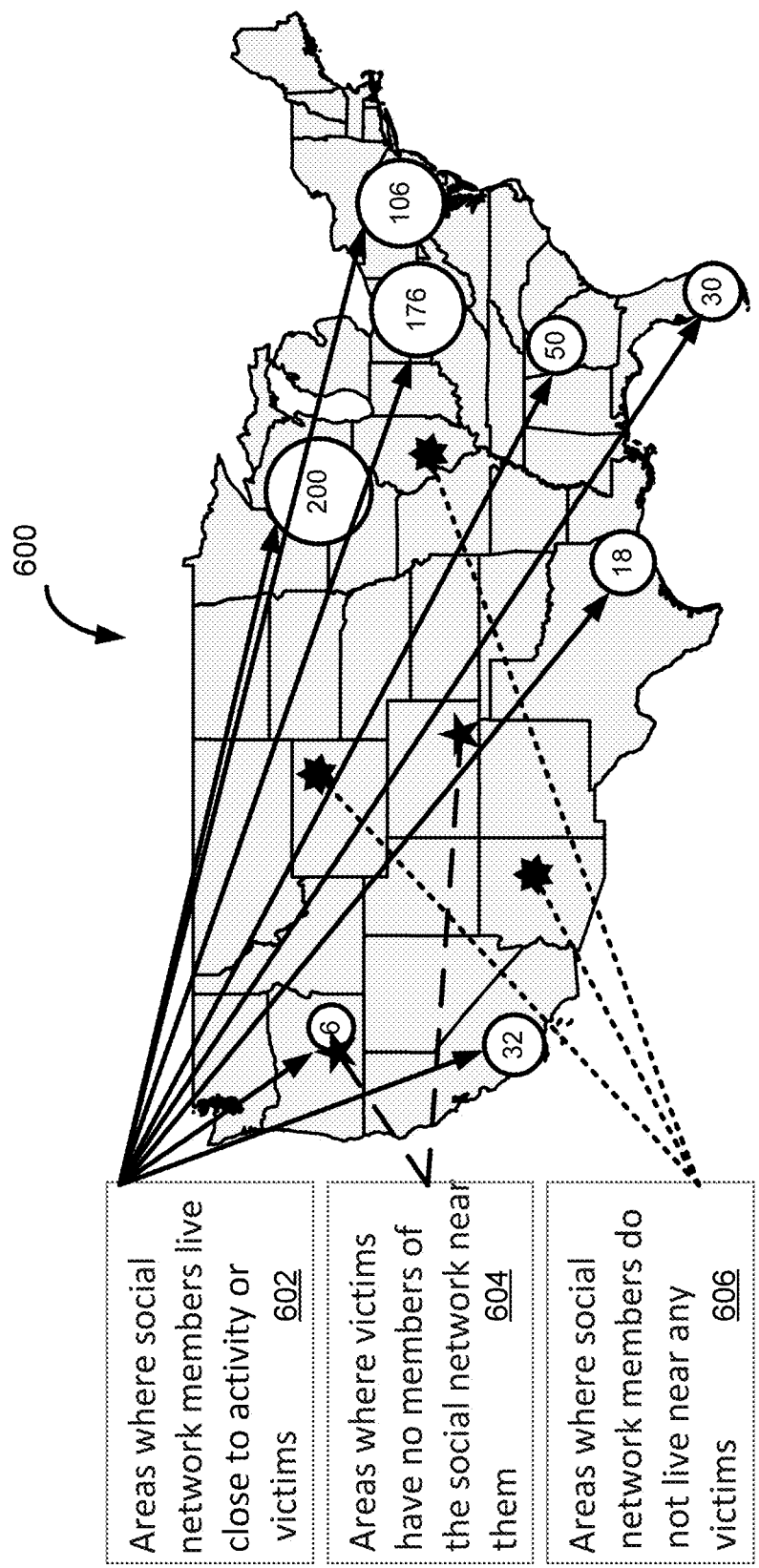
FIG. 6 illustrates an example geo-social mapping, according to an example embodiment of the disclosed technology.

FIG. 6 illustrates another example application of the disclosed technology, as it may be applied to activities associated with identity theft. Many other example applications may utilize the systems and methods of the disclosed technology, and this particular illustrative example is not intended to limit the scope of the disclosed technology. FIG. 6 illustrates a graphical example of a person' geo-social map 600 in which a high probability may exist that the person associated with the geo-social map is involved in certain activities, such as identity theft. For example, areas 602, as shown, may indicate areas of the person's social network having many related entities that live close to a particular activity or set of activities, such as addresses of identity theft victims. A high overlap of the person's social network with such regions may produce a high score or likelihood that the person is involved some way in the activity. Also shown in FIG. 6 are areas 604 in which a person's social network has no members near victims. Such information may be utilized to modify the score or likelihood that the person is involved in a particular activity. Also shown in FIG. 6 are areas 606 in which a person's social network has members, but not near any activities (or addresses of victims of identity theft). Such information may be utilized to modify the score or likelihood that the person is involved in the activity. For example, a very well connected individual may have connected entities all over the United States, and if only those connected entities are considered that overlap regions of high identity theft, then such a well connected individual may be flagged, but may be a false positive. Taken as a whole, the person's entire geo-social network may allow the proper weighting and scoring to downgrade the likelihood of being involved in certain activities when numerous other geo-connections exist that do not overlap with regions of high activity incidence.

Figure 7:
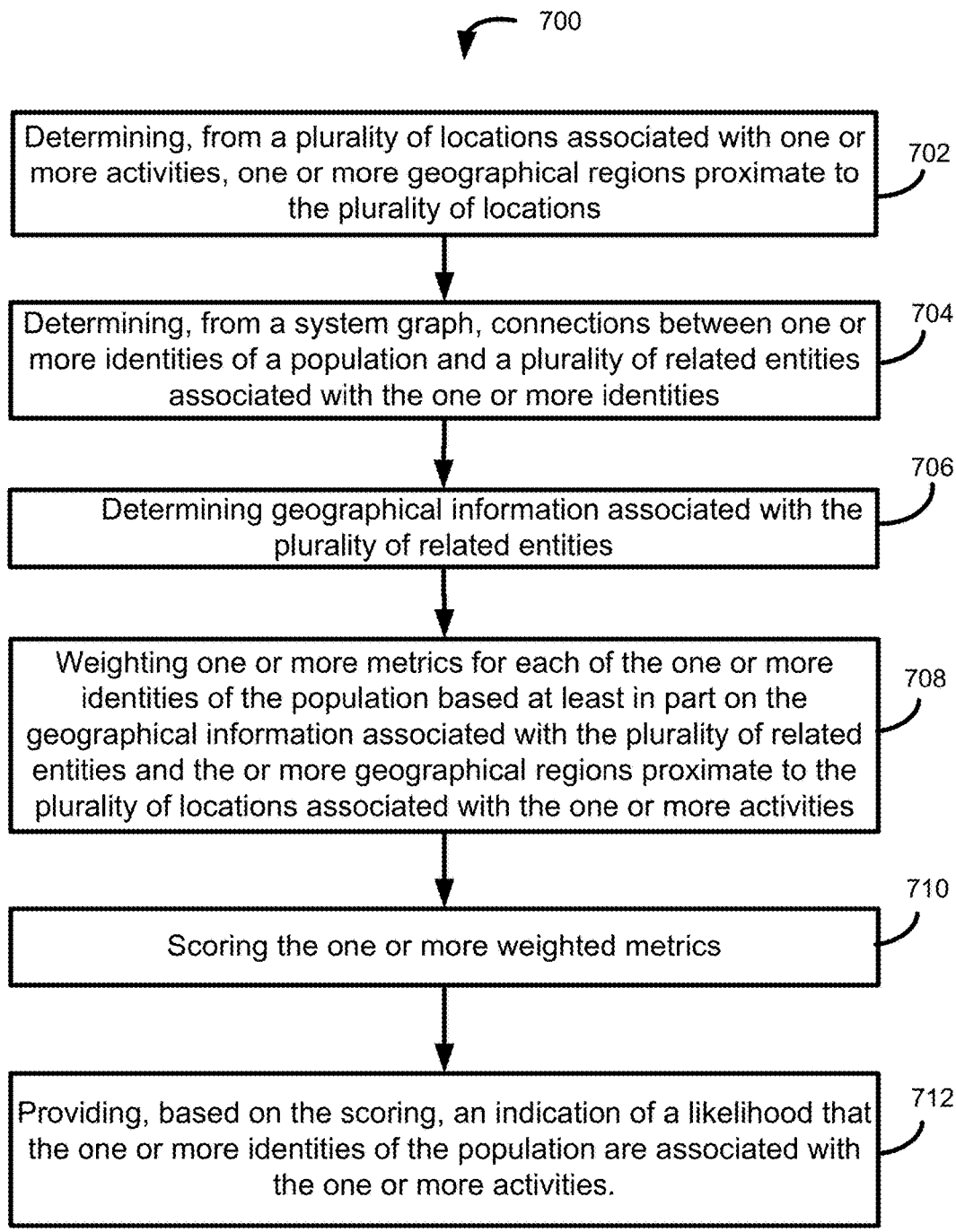
FIG. 7 is a flow-diagram of a method, according to an example embodiment of the disclosed technology.

An example method 700 for identifying one or more entities associated with certain activities will now be described with reference to the flowchart of FIG. 7. The method 700 starts in block 702, and according to an example implementation includes determining, from a plurality of locations associated with one or more activities, one or more geographical regions proximate to the plurality of locations. In block 704, the method 700 includes determining, from a system graph, connections between one or more identities of a population and a plurality of related entities associated with the one or more identities. In block 706, the method 700 includes determining geographical information associated with the plurality of related entities. In block 708, the method 700 includes weighting one or more metrics for each of the one or more identities of the population based at least in part on the geographical information associated with the plurality of related entities and the or more geographical regions proximate to the plurality of locations associated with the one or more activities. In block 710, the method 700 includes scoring the one or more weighted metrics. In block 712, the method 700 includes providing, based on the scoring, an indication of a likelihood that the one or more identities of the population are associated with the one or more activities.

In and example implementation, determining connections between the one or more identities of a population and a plurality of related entities associated with the one or more identities may include determining one or more of relative connections, business associate connections, social network connections, and historical address connections. According to an example implementation, the system graph may include information associated with one or more public records including one or more of housing records, vehicular records, marriage records, divorce records, hospital records, death records, court records, property records, employment records, business records, address records, tax records, corporate records, incarceration records, and utility records, wherein the utility records comprise one or more of utility hookups, disconnects, and associated service addresses.

According to an example implementation, weighting the one more metrics may include applying a weight corresponding to a distance between the geographical regions proximate to the plurality of locations (or addresses or regions) associated with the one or more activities and the geographical information associated with the plurality of related entities. In another example implementation, weighting the one more metrics may include applying a weight corresponding to a distance between the one or more identities of the population and the plurality of related entities associated with the one or more identities.

In an example implementation, determining a geographical region proximate to an locations associated with one or more activities may include determining a series of concentric areas overlapping the address. In one example embodiment, the concentric areas overlapping the address may be determined, at least in part, based on features comprising one or more of local natural formations, man-made formations, streets, walking areas, population, businesses, and neighborhoods.

Certain implementations of the disclosed technology may be used to identify potential organizations of identity theft, fraud, or other activities which may be spread-out geographically. For example, the input data for the system graph may be derived from historical address history of a population to be examined and such address history may be used to link individuals based on, for example, familial, residential, and business relationships. Embodiments of the disclosed technology may use such information to determine connections, weight metrics, and/or score the data.

According to example implementations, certain technical effects can be provided, such as creating certain systems and methods that are able to identify someone who is connected to various other entities where a high incidence of identity theft has taken place. Embodiments of the disclosed technology may be utilized to examine geographical and social data for indications of collusion. According to example implementations, certain technical effects can be provided, such as creating certain systems and methods that are able to identify someone who is connected to various other entities where a high incidence of a certain activity has taken place.

According to an example implementation of the disclosed technology, certain disclosed methods may be handled by a scoring unit, for example, to score the various connections. In an example implementation, a filtering unit may be utilized to filter out and those connections that are deemed to be below a threshold based on the scoring.

Without limitation, some features considered for the scoring algorithm with respect to embodiments disclosed may include: (1) the number of people in one's social, family, or business network who live or work close to incidents; (2) the geographical spread of one's network; and (3) the distance between incidents and the people in one's network. Analysis of these features, according to an example embodiment, may enable the system to identify, among others, social, family, or business networks that have a high correlation with geographical incidents. As indicated previously, such incidents may be associated with identity theft or other fraudulent activities, but embodiments disclosed may apply to other applications in which geographical information may be utilized for identifying individuals.

Various embodiments of the geo-social analysis systems and methods may be embodied, in whole or in part, in a computer program product stored on non-transitory computer-readable media for execution by one or more processors. It will thus be understood that various aspects of the disclosed technology, such as the scoring unit and the filtering unit, may comprise hardware or software of a computer system, as discussed above with respect to FIG. 3. It will also be understood that, although these units may be discussed herein as being distinct from one another, they may be implemented in various ways. The distinctions between them throughout this disclosure are made for illustrative purposes only, based on operational distinctiveness.

Application of the various embodiments of the systems and methods disclosed herein need not be limited to those above. For example, an example may be used to identify potential activity related to credit card application misrepresentation, identity fraud, investment fraud, crimes, business fraud, mail and/or delivery fraud, and various other various types of activities that might involve geographical information and social networks.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for identifying one or more entities associated with one or more fraudulent activities, the method comprising:
    determining, by at least one processor configured to access at least one online network, and from a plurality of locations associated with one or more online activities, one or more geographical regions proximate to the plurality of locations;
    determining, from a system graph and by the at least one processor, connections between one or more identities of a population and a plurality of related entities associated with the one or more identities, wherein the connections are determined based on common relations in the system graph;
    determining geographical information associated with the plurality of related entities;
    determining one or more physical addresses associated with one or more incidents of identity theft;
    weighting, by the at least one processor, one or more metrics for at least a portion of the one or more identities of the population based at least in part on the geographical information associated with the plurality of related entities and the one or more geographical regions proximate to the plurality of locations associated with the one or more activities, wherein the weighting the one or more metrics comprises applying a measure of common connections between the one or more identities and the plurality of related entities based on a distance between the geographical regions proximate to the plurality of locations associated with the one or more activities and the one or more physical addresses associated with one or more incidents of identity theft; and
    outputting, based on the weighting, an indication of a likelihood that the one or more identities of the population are associated with one or more fraudulent activities related to identity theft.

2. The method of claim 1, wherein determining connections between the one or more identities of a population and a plurality of related entities associated with the one or more identities comprise determining one or more of relative connections, business associate connections, social network connections, and historical address connections.

3. The method of claim 1, wherein the system graph comprises information associated with one or more public records including one or more of housing records, vehicular records, marriage records, divorce records, hospital records, death records, court records, property records, employment records, business records, address records, tax records, corporate records, incarceration records, and utility records, wherein the utility records comprise one or more of utility hookups, disconnects, and associated service addresses.

4. The method of claim 1, wherein weighting the one or more metrics comprises applying a weight corresponding to the geographical information associated with the plurality of related entities.

5. The method of claim 1, wherein weighting the one or more metrics comprises applying a weight corresponding to a distance between the one or more identities of the population and the plurality of related entities associated with the one or more identities.

6. The method of claim 1, wherein determining a geographical region proximate to the plurality of locations associated with the one or more activities comprises determining a series of concentric areas overlapping an address.

7. The method of claim 6, wherein the concentric areas overlapping the address are determined at least in part based on features comprising one or more of local natural formations, man-made formations, streets, walking areas, population, businesses, and neighborhoods.

8. A system comprising:
at least one memory for storing data and computer-executable instructions; and
at least one processor configured to access the at least one memory and at least one online network, and further configured to execute the computer-executable instructions to:
determine, from a plurality of locations associated with one or more online activities, one or more geographical regions proximate to the plurality of locations;
determine, from a system graph, and by the at least one processor, connections between one or more identities of a population and a plurality of related entities associated with the one or more identities, wherein the connections are determined based on common relations in the system graph;
determine geographical information associated with the plurality of related entities;
determine one or more physical addresses associated with one or more incidents of identity theft;
weight, with the at least one processor, one or more metrics for at least a portion of the one or more identities of the population based at least in part on the geographical information associated with the plurality of related entities and the one or more geographical regions proximate to the plurality of locations associated with the one or more activities, wherein the weighting the one or more metrics comprises applying a measure of common connections between the one or more identities and the plurality of related entities based on a distance between the geographical regions proximate to the plurality of locations associated with the one or more activities and the one or more physical addresses associated with one or more incidents of identity theft; and
output, based on the weighting, an indication of a likelihood that the one or more identities of the population are associated with one or more fraudulent activities related to identity theft.

9. The system of claim 8, wherein determining connections between the one or more identities of a population and a plurality of related entities associated with the one or more identities comprise determining one or more of relative connections, business associate connections, social network connections, and historical address connections.

10. The system of claim 8, wherein the system graph comprises information associated with one or more public records including one or more of housing records, vehicular records, marriage records, divorce records, hospital records, death records, court records, property records, employment records, business records, address records, tax records, corporate records, incarceration records, and utility records, wherein the utility records comprise one or more of utility hookups, disconnects, and associated service addresses.

11. The system of claim 8, wherein weighting the one or more metrics comprises applying a weight corresponding to a distance between the geographical regions proximate to the plurality of locations associated with the one or more activities and the geographical information associated with the plurality of related entities.

12. The system of claim 8, wherein weighting the one or more metrics comprises applying a weight corresponding to a distance between the one or more identities of the population and the plurality of related entities associated with the one or more identities.

13. The system of claim 8, wherein determining a geographical region proximate to the plurality of locations associated with the one or more activities comprises determining a series of concentric areas overlapping an address.

14. The system of claim 13, wherein the concentric areas overlapping the address are determined at least in part based on features comprising one or more of local natural formations, man-made formations, streets, walking areas, population, businesses, and neighborhoods.

15. A non-transitory computer-readable medium that stores instructions which, when executed by at least one processor in a system, cause the system to perform a method comprising:
determining, by at least one processor configured to access at least one online network, and from a plurality of locations associated with one or more online activities, one or more geographical regions proximate to the plurality of locations;
determining, from a system graph and by the at least one processor, connections between one or more identities of a population and a plurality of related entities associated with the one or more identities, wherein the connections are determined based on common relations in the system graph;
determining geographical information associated with the plurality of related entities;
determining one or more physical addresses associated with one or more incidents of identity theft;
weighting, by the at least one processor, one or more metrics for at least a portion of the one or more identities of the population based at least in part on the geographical information associated with the plurality of related entities and the one or more geographical regions proximate to the plurality of locations associated with the one or more activities, wherein the weighting the one or more metrics comprises applying a measure of common connections between the one or more identities and the plurality of related entities based on a distance between the geographical regions proximate to the plurality of locations associated with the one or more activities and the one or more physical addresses associated with one or more incidents of identity theft; and
outputting, based on the weighting, an indication of a likelihood that the one or more identities of the population are associated with one or more fraudulent activities related to identity theft.

16. The non-transitory computer-readable medium of claim 15, wherein determining connections between the one or more identities of a population and a plurality of related entities associated with the one or more identities comprise determining one or more of relative connections, business associate connections, social network connections, and historical address connections.

17. The non-transitory computer-readable medium of claim 15, wherein the system graph comprises information associated with one or more public records including one or more of housing records, vehicular records, marriage records, divorce records, hospital records, death records, court records, property records, employment records, business records, address records, tax records, corporate records, incarceration records, and utility records, wherein the utility records comprise one or more of utility hookups, disconnects, and associated service addresses.

18. The non-transitory computer-readable medium of claim 15, wherein weighting the one more metrics comprises applying a weight corresponding to a distance between the geographical regions proximate to the plurality of locations associated with the one or more activities and the geographical information associated with the plurality of related entities, and wherein weighting the one more metrics comprises applying a weight corresponding to a distance between the one or more identities of the population and the plurality of related entities associated with the one or more identities.

19. The non-transitory computer-readable medium of claim 15, wherein determining a geographical region proximate to the plurality of locations associated with the one or more activities comprises determining a series of concentric areas overlapping an address.

20. The non-transitory computer-readable medium of claim 15, wherein the concentric areas overlapping the address are determined at least in part based on features comprising one or more of local natural formations, man-made formations, streets, walking areas, population, businesses, and neighborhoods.

\* \* \* \* \*